I. W. LEEPER.
HOG OILING DEVICE.
APPLICATION FILED FEB. 6, 1915.

1,167,188.

Patented Jan. 4, 1916.
2 SHEETS—SHEET 1.

Witnesses
Gerald Hennesy

Inventor
I. W. Leeper,
By Victor J. Evans
Attorney

I. W. LEEPER.
HOG OILING DEVICE.
APPLICATION FILED FEB. 6, 1915.

1,167,188.

Patented Jan. 4, 1916.
2 SHEETS—SHEET 2.

Witnesses
Gerald Hennesy
C. C. Hines

Inventor
I. W. Leeper,
By Victor J. Evans
Attorney

UNITED STATES PATENT OFFICE.

ISAAC W. LEEPER, OF MONMOUTH, ILLINOIS.

HOG-OILING DEVICE.

1,167,188. Specification of Letters Patent. Patented Jan. 4, 1916.

Application filed February 6, 1915. Serial No. 6,562.

*To all whom it may concern:*

Be it known that I, ISAAC W. LEEPER, a citizen of the United States, residing at Monmouth, in the county of Warren and State of Illinois, have invented new and useful Improvements in Hog-Oiling Devices, of which the following is a specification.

This invention relates to a device for use in applying medicinal oils or other medicinal substances to hogs and pigs, for the purpose of destroying lice and other vermin as well as curing certain complaints, such as scab.

The object of the invention is to provide a device against which the animals may rub, and whereby the oil, medicinal substance or insecticide will be transferred from a trough or storage receptacle to the animal, allowing the animal to treat itself when troubled with vermin or complaints of the character mentioned.

The invention consists of the features of construction, combination and arrangement of parts herein fully described and claimed, reference being had to the accompanying drawings in which:—

Figure 1:
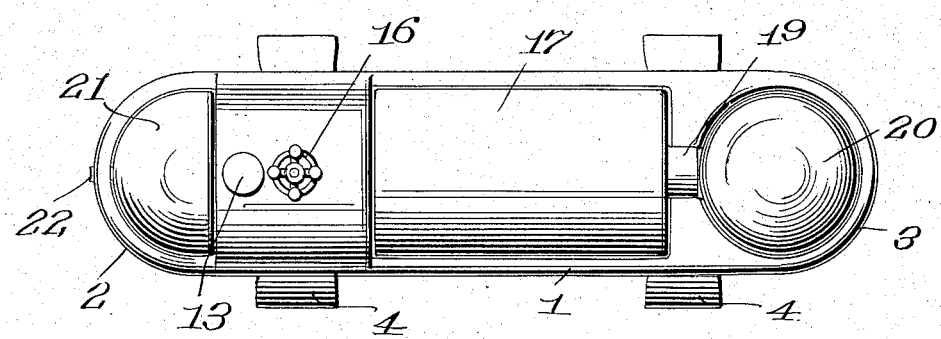
Figure 3:
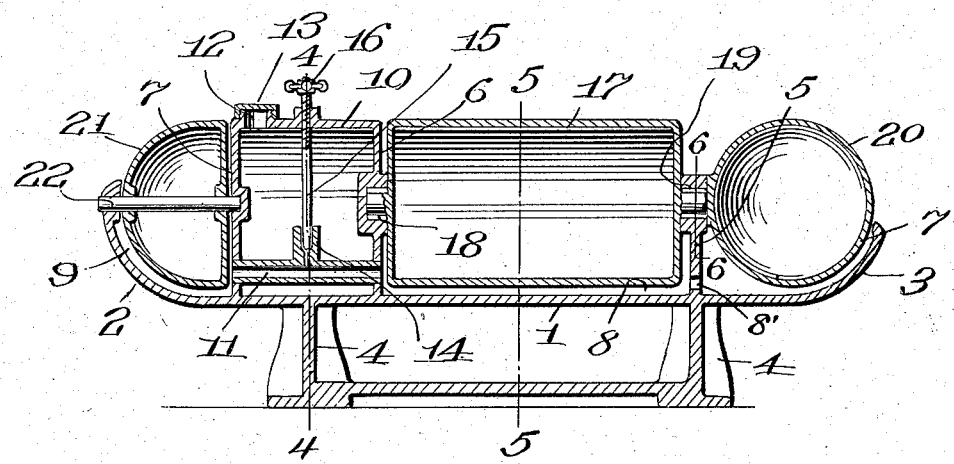
Figure 2:
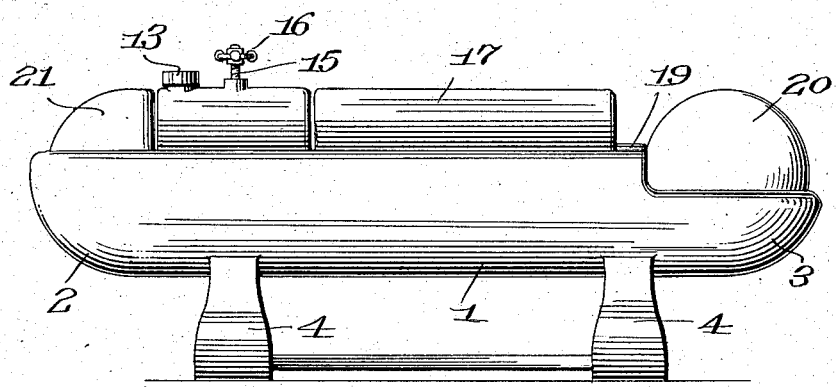
Figure 4:
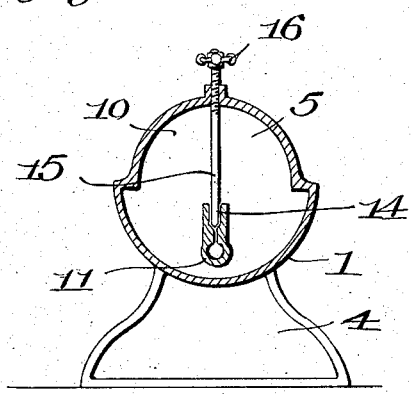
Figure 5:
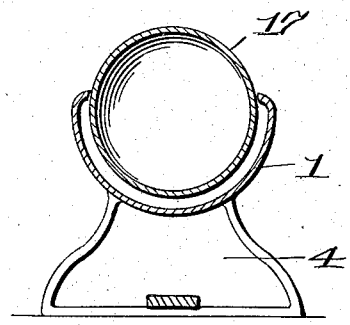
Figure 6:
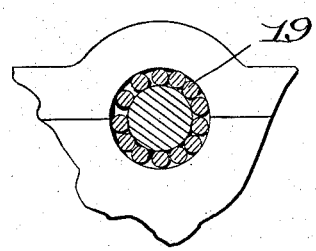

Figure 1 is a top plan view of a device of the character described embodying my invention. Fig. 2 is a side elevation of the same. Fig. 3 is a vertical longitudinal section. Figs. 4, 5 and 6 are vertical, transverse sections on the lines 4—4, 5—5 and 6—6 of Fig. 3.

In carrying my invention into practice, I provide an oblong trough or tank 1, preferably provided with rounded ends 2 and 3, and supported at a desired elevation upon legs or standards 4, said trough being made of metal or other suitable material. The trough is provided with vertical, transverse partitions 5, 6 and 7. The partition 5 forms with the end 3 a chamber 7' which is in communication with the intermediate portion or main chamber 8 of the trough through one or more passages 8', while the partition 7 forms with the end 2 a chamber 9 and the partitions 6 and 7 form an oil storage reservoir 10. The reservoir 10 is in communication with the chambers 7' and 9 by way of a supply or feed pipe 11.

The medicament to be used may be a medicinal oil or liquid medicinal substance having the desired properties. This is supplied at intervals to the reservoir 10 through an inlet 12 normally closed by a cap 13. This reservoir is in communication through a port 14 with the pipe 11, and the said port 14 is governed by a vertically movable valve 15 extending externally of the reservoir and tank and having a suitable manipulating handle 16. It will thus be understood that the liquid medicament may be allowed to flow from the reservoir to the chambers 8 and 9 to replenish the latter whenever required, and that the liquid flows from the chamber 8 to the chamber 7' through the openings in the partition 5.

The means for applying the medicinal substance to the animals comprises an elongated cylindrical roll 17 disposed within the chamber 8 and provided with journals 18 turning in anti-friction bearings 19 in the two partitions 5 and 6. A portion of the surface of the roller 17 is exposed for contact with the animal, who by rubbing against the same will be coated with the oil or medicinal substance. The action of the animal in contacting with the roller causes said roller to revolve, thus bringing a newly coated surface into position for use. As the roller is mounted to turn freely on anti-friction bearings, it is evident that it may be easily turned by contact with the small and weak animals, so that both hogs and pigs may receive treatment. Arranged within the chamber 7' is a spherical roller 20, which is preferably connected with the journal 18 so as to revolve with the roller 17, which roller 20 takes up the medicament from the chamber 7'. This roller is preferably provided for the treatment of small animals crowded away from the main roller by larger animals. In addition another roller 21 is preferably mounted in the chamber 9 to turn upon a spindle 22, and which revolves independently of the rollers 17 and 20, but is intended for the same purpose as the roller 20. The supply of the medicament to the several chambers in which these rollers revolve is controlled by means of the valve 15 which may be adjusted to regulate the effective area of the port 14 and to close said port to cut off the outflow of air whenever the reservoir is being refilled through the inlet 12.

The apparatus is designed for the purpose of enabling hogs infested with vermin or troubled with scab or like complaints to treat themselves, which they readily learn to do after having been given one or two manual treatments and receiving the benefits therefrom, it being understood, however, that the device may be disposed in a pen so as to provide a surface against which the animals may rub or scratch, or may be arranged in a gate way and so constructed that animals passing thereover will be compelled to slide over the rollers, by which their bodies will be coated with the medicinal substance. Other ways of employing the device for the purpose described may be adopted.

I claim:—

1. A device of the character described comprising a trough having a central compartment, end compartments, and a storage reservoir between said central compartment and one of said end compartments, said compartments being in communication with each other, rollers mounted to revolve in the respective compartments, means for filling the reservoir, and means for governing the flow of the medicament from said reservoir to the compartments.

2. A device of the character described comprising a trough having a central compartment, end compartments and a storage reservoir between said central compartment and one of said end compartments, a supply pipe connecting said compartments, the said central compartment being in direct communication with the other end compartment, rollers mounted to revolve in the respective compartments, means for filling the reservoir, and means governing the flow of the medicament from said reservoir to said supply pipe.

3. A device of the character described comprising a trough having a central compartment, end compartments, and a storage reservoir between said central compartment and one of said end compartments, a supply pipe connecting said compartments, the said central compartment being in direct communication with the other end compartment, rollers mounted to revolve in the central compartment and latter-named end compartment and connected for movement in unison, a roller mounted to revolve within the other end compartment, means for filling the reservoir, means governing the flow of the medicament from said reservoir to the said supply pipe.

In testimony whereof I affix my signature in presence of two witnesses.

I. W. LEEPER.

Witnesses:
J. B. LEWIS,
P. O. BROOKS.

Copies of this patent may be obtained for five cents each, by addressing the "Commissioner of Patents, Washington, D. C."